(12) United States Patent
Okumura

(10) Patent No.: US 6,900,953 B2
(45) Date of Patent: May 31, 2005

(54) METHOD OF HOLDING PLASTIC LENS AND PLASTIC LENS HOLDING STRUCTURE

(75) Inventor: Tetsuya Okumura, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/895,084

(22) Filed: Jul. 21, 2004

(65) Prior Publication Data

US 2005/0018320 A1 Jan. 27, 2005

(30) Foreign Application Priority Data

Jul. 23, 2003 (JP) .................................... 2003-278101

(51) Int. Cl.$^7$ ................................................ G02B 7/02
(52) U.S. Cl. ................... 359/819; 359/820; 362/455; 353/100
(58) Field of Search ............................. 359/819, 820; 362/455; 353/100

(56) References Cited

U.S. PATENT DOCUMENTS

| 4,737,017 | A | * | 4/1988 | Nagasaka | 359/811 |
| 5,623,702 | A | * | 4/1997 | Pearson | 396/6 |
| 6,310,735 | B1 | * | 10/2001 | Best et al. | 359/819 |

FOREIGN PATENT DOCUMENTS

JP 8-136783 5/1996

* cited by examiner

Primary Examiner—Hung Dang
Assistant Examiner—Joseph Martinez
(74) Attorney, Agent, or Firm—Young & Thompson

(57) ABSTRACT

A plastic lens is fixedly held in precise position a lens holder by cramming a deformable retaining ring between a front collar and a periphery of the plastic lens loosely put in an annular mounting space formed in the lens holder and crushing the front collar against the retaining ring so as thereby to rivet the plastic lens to the lens holder.

5 Claims, 3 Drawing Sheets

METHOD OF HOLDING PLASTIC LENS AND PLASTIC LENS HOLDING STRUCTURE

BACKGROUND OF THE INVENTION

1. Field of the Invention

The present invention relates to a method of holding a plastic lens and a plastic lens holding structure.

2. Description of Related Art

In recent years, injection molded plastic lenses are widely used in optical instruments including, in particular, conventional photographic cameras, digital cameras equipped with solid state image forming devices, vide cameras, overhead projectors, film projectors and the like. Such a plastic lens is held in a lens holder forming a part of a lens barrel of an optical instrument with a retaining ring or adhered to the lens holder. In the case of using a retaining ring to hold the plastic lens in the lens holder, it is necessary to install a connecting mechanism such as a screw-connecting mechanism between the plastic lens and the lens holder. It is hard for current optical instruments that are confronted with a strong demand for miniaturization on to secure a space for the connecting mechanism. On the other hand, in the case of adhering the plastic lens to the lens holder, there is fear that the plastic lens is chemically corroded due to chemical reaction between an adhesive cement and an optical plastic material constituting the plastic lens or that an adhesive cement is sometimes hard to bond the plastic lens and the lens holder depending on adhesive cement and/or optical plastic material. Furthermore, it is hard to keep the plastic lens precisely held in the lens holder considering the effect of curing and shrinkage of the adhesive cement, a difference in thermal expansion coefficient between the plastic lens, the adhesive cement and the lens holder, and/or a change in ambient temperature.

There have been proposed techniques for riveting a plastic lens and a lens holder together as one of solutions to the problems. One of the techniques is disclosed, for example, in Japanese Unexamined Patent Publication No. 8-136783. This technique is such that a lens holder at its periphery is heated and deformed so as thereby to rivet or hot-weld the plastic lens to the lens holder and, in consequence, there is no necessity for a space for the connecting mechanism around the plastic lens, nor is there any necessity of using adhesive cement.

The prior art technique is, however, accompanied by the problem of thermal distortion of the plastic lens resulting from welding a periphery of the lens holder. Although it is of use to employ mechanical riveting in place of the hot riveting, the mechanical riveting subjects the lens holder to undesirably strong riveting force, possibly causing distortion of the plastic lens.

SUMMARY OF THE INVENTION

It is therefore an object of the present invention to provide a method of fixedly holding a plastic lens in a lens holder and a plastic lens holding structure that has no necessity for a large space around the plastic lens.

It is another object of the present invention to provide a method of fixedly holding a plastic lens in a lens holder and a plastic lens holding structure for precisely holding a plastic lens in position in a lens holder and preventing an occurrence of distortion of the plastic lens.

The foregoing objects of the present invention are achieved by a method of fixedly holding a plastic lens in a lens holder by riveting the plastic lens to the lens holder comprising the steps of setting the plastic lens in the lens holder having an annular mounting space defined between a front annular collar and a rear annular flange with a periphery of the plastic lens loosely received in the annular mounting space, cramming a plastic retaining ring between said front annular collar and the periphery of the plastic lens so as to fixedly hold the lens in position in the lens holder, and then crushing the front annular collar against the plastic retaining ring so as thereby to rivet the plastic lens to the lens holder.

According to the plastic lens holding method, the plastic lens is immovably held in precise position in the lens holder by means of the plastic retaining ring and then riveted to the lens holder. Therefore, even in the event where sufficiently strong riveting force is applied to the plastic lens through the plastic retaining ring, the plastic lens is prevented from causing distortion resulting from that the plastic retaining ring deforms under the riveting force and, in consequence, functions as buffer means to absorb the riveting force. Consequently, there is not necessity to provide a space for a connecting mechanism around the plastic lens, nor is there no necessity to use adhesive cement like the prior art. In addition, it is not necessary to apply heat to the plastic lens, directly or indirectly, the plastic lens is well prevented from causing distortion and fixedly held in precise position in the lens holder.

Further, the foregoing objects of the present invention are achieved by the plastic lens holding structure comprising a lens holder having an annular frame, a front annular collar extending inwardly from the annular frame, and a rear annular flange extending inwardly from the annular frame by which an annular mounting space for loosely receiving a periphery of a plastic lens is defined and a plastic retaining ring that is crammed between the front annular collar and the periphery of the plastic lens put in the annular mounting space so that plastic lens is riveted to the lens holder by crushing the front annular collar against the plastic retaining ring.

According to the plastic lens holding structure, even when applying external axial force to the plastic lens through the plastic retaining ring upon crushing the front annular collar of the lens holder for riveting the plastic lens to the lens holder, the plastic retaining ring deforms and, in consequence, functions as buffer means to prevent the plastic lens from causing distortion due to the strong riveting force while the plastic lens is fixedly held to the lens holder and is kept in precise position in the lens holder. Consequently, there is not necessity to provide a space for a connecting mechanism around the plastic lens, nor is there no necessity to use adhesive cement like the prior art In addition, it is not necessary to apply heat to the plastic lens, directly or indirectly, the plastic lens is well prevented from causing distortion and fixedly held in precise position in the lens holder.

It is preferred for the plastic retaining ring to have an annular groove formed in an inner wall surface thereof so as to develop a tendency to pave the way for comparatively easy resilient deformation under external axial load. In this instance, the plastic retaining ring enhances its deforming capability with the consequence that the plastic lens is more reliably prevented from causing distortion even under increased riveting force.

As described above, the plastic lens holding method and the plastic lens holding structure of the present invention ensures that the plastic lens is fixedly held in precise position in the lens holder without not only providing a large space around the plastic lens but also causing distortion of the plastic lens.

BRIEF DESCRIPTION OF THE DRAWINGS

The above and other objects and features of the present invention will be clearly understood from the following detailed description when read with reference to the accompanying drawings, wherein the same numeral numbers have been used to denote same or similar parts or mechanisms throughout the drawings and in which.

DETAILED DESCRIPTION OF PREFERRED EMBODIMENTS

In the following description, parts which are not of direct importance to the invention and parts which are purely of conventional construction will not be described in detail. For example, details of remote control means, automatic focusing means, exposure metering means and finder means will not be set out in details since their construction and operation can easily be arrived at by those skilled in the art. The term "axial direction" as used herein shall mean and referred to a direction in parallel to an optical axis of a lens.

Figure 1:
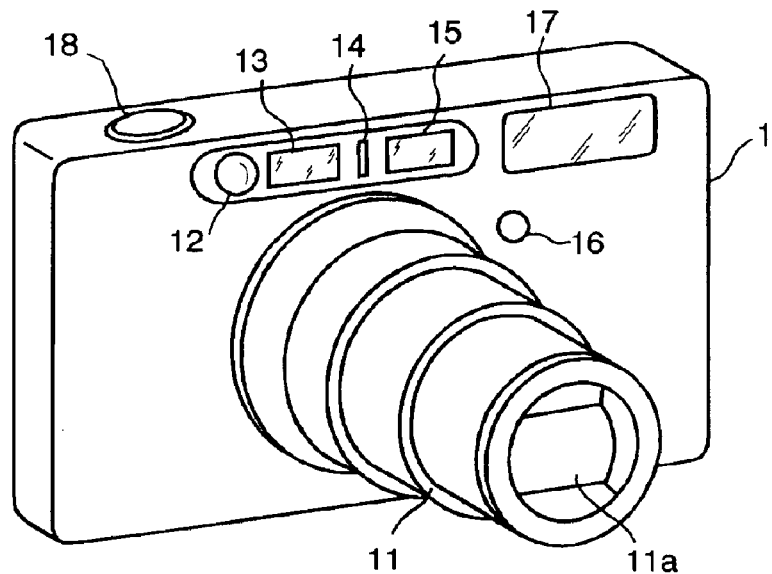
FIG. 1 is a perspective view of a photographic camera equipped with a zoom lens barrel in which a plastic lens holding structure of the present invention is realized.

Referring to the drawings in detail, and, in particular, to FIG. 1 showing a conventional photographic camera for use with a roll film in which a lens holding structure according to a preferred embodiment of the present invention is realized, the photographic camera has a camera body 1 equipped with a zoom lens barrel 11 mounted to a front wall of the camera body 1 and further provided with a remote control sensor window 12, an automatic focusing sensor window 13, an indicator lamp 14, a finder objective lens window 15, an exposure meter sensor window 16 and a flash window 17 all of which are formed in the upper front wall of the camera body 1. The lens barrel 11 includes a zoom lens system having a plastic lens 11a as one lens component The remote control sensor window 12 permits a remote control signal from a remote control unit separately provided from the camera body 1 to reach a camera control unit (not shown) in the camera body 1. The automatic focusing sensor window 13 permits a signal from a subject to reach a photo receiving element of an automatic focusing system (not show) in the camera body 1. The indicator lamp 14 casts light as a perceivable indication for calling an operator's attention or a subject person's attention to the progress of self-timer photography or the progress of remotely controlled photography. The exposure meter sensor window 16 permits light from a field of view to reach a photo receiving element of an automatic exposure control system (not shown) in the camera body 1. The flash window 17, that forms a diffusive panel of an electronic flash unit (not shown) synchronized with photo shooting, is adapted to vary an angle of illustration axis according to an adjusted focal length of the zoom lens system and a subject distance. The camera body 1 is further provided with a shutter release button 18 installed to a top wall thereof. The shutter release button 18 is operated to start sequential control of an exposure mechanism including a programmed shutter that is designed so as to increasingly vary its aperture with time.

Figure 2:
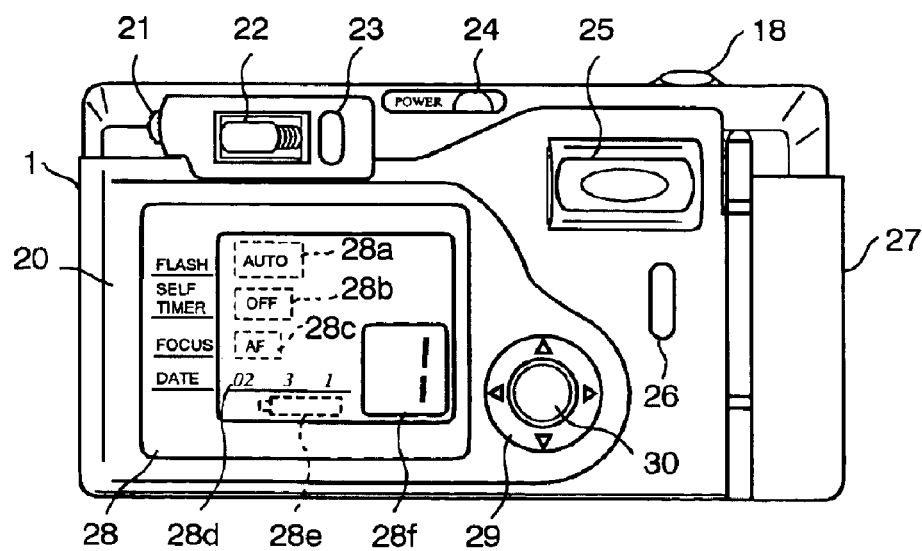
FIG. 2 is a rear view of the photographic camera.

Referring to FIG. 2, the camera body 1 has a back lid 20 and is provided with an eyesight adjustment knob 21, a finder eyepiece lens window 22, an indicator lamp 23 and a power switch button 24 which are all installed to an upper rear wall of the camera body. The indicator lamp 23 is turned on or flashes upon coming to a complete end of focus adjustment by the automatic focusing mechanism. The back lid 20 is provided with a zooming button 25, a confirmation window 26, a battery chamber cover 27 and a monitor screen 28. The zooming button 25 is operated to vary the focal length of the zoom lens system between a telephoto end (the longest focal length) and a wide angled end (the shortest focal length). The monitor screen 28, that is made up of a liquid crystal panel, includes a flash mode display 28a for selectively indicating flash modes such as an automatic flashing mode, a red-eye-reduction flashing mode, etc., a self-timer mode display 28b for indicating that the camera is in a self-timer photography mode or in a remotely controlled photography mode, a focusing mode display 28c for indicating that the camera is in an automatic focusing mode, a date display 28d for indicating a date (year, month, day) and a time (hour, minute) of shooting, a battery power display 28e for indicating a remaining capacity of a battery, and an exposed number display 28f for indicating the number of exposed flames. The back lid 20 is further provided with a selection button 29 operable crossways to select various menus and modes to be displayed on the monitor screen 28 and a display/decision button 30 for fixing a menu and/or a mode selected by the selection button 29 and displaying the fixed menu and/or the fixed mode.

Figure 3:
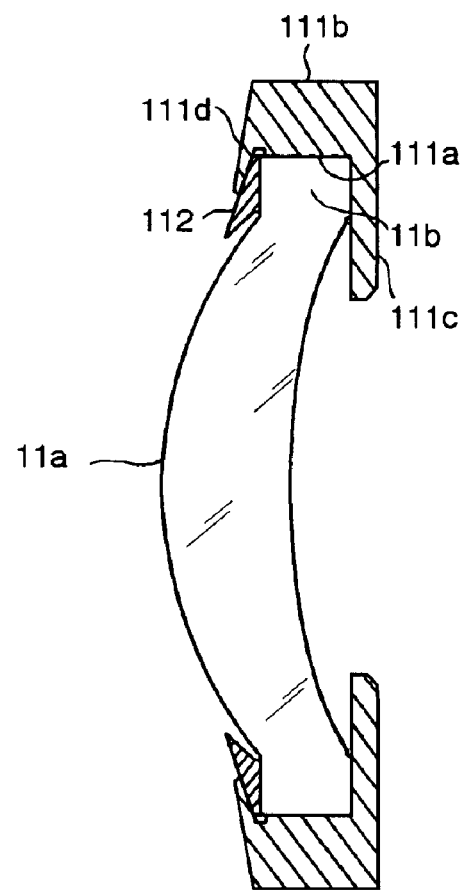
FIG. 3 is a sectional view of a plastic lens holding structure according to a preferred embodiment of the present invention.

Referring to FIG. 3, the plastic lens 11a is fixedly held in a lens holder 111 forming a part of the lens barrel 11 by means of riveting. Specifically, the lens holder 111, that is formed as one integral piece, comprises an annular frame 111b, an annular rear flange 111c extending inwardly from the back of the annular frame 111b, and an annular front collar 111d extending inwardly and diagonally forward from the front of the annular frame 111b so as to define an annular mounting space 111a for receiving a peripheral rim 11b of the plastic lens 11a with an axial gap left between the annular front collar 111d and the peripheral rim 11b of the plastic lens 11a. The lens holder 111 is shaped to provide the annular mounting space 111a with the annular mounting space 111a having a width in an axial direction greater than a thickness of the peripheral rim 11b of the plastic lens 11a so as to leave an axial gap between the annular front collar 111d of the lens holder 111 and the peripheral rim 11b of the plastic lens 11a.

Figure 4:
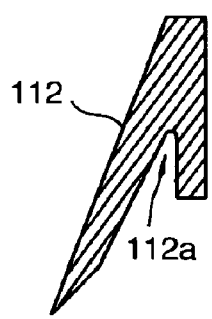
FIG. 4 is a sectional view of a plastic retaining ring.

A generally wedge-shaped retaining ring 112 made up of a resin material is crammed into the axial gap between the annular front collar 111d of the lens holder 111 and the peripheral rim 11b of the plastic lens 11a so as thereby to press the peripheral rim 11b of the plastic lens 11a against the annular rear flange 111c of the lens holder 111. As shown in FIG. 4 in detail, the wedge-shaped plastic retaining ring 112 has an inner annular groove 112a formed in an inner wall thereof so as to develop a tendency to pave the way for comparatively easy resilient deformation under external axial load.

When assembling the plastic lens 12a to the lens barrel 12, the plastic lens 12a is put in the lens holder 111 with the peripheral rim 11b of the plastic lens 11a loosely received in the annular mounting space 111a. Subsequently, the wedge-shaped plastic retaining ring 112 is crammed into the axial gap left between the annular front collar 111d of the lens holder 111 and the peripheral rim 11b of the plastic lens 11a in the annular mounting space 111a sufficiently enough to firmly bear down on the peripheral rim 12b of the plastic lens 12a against the annular rear flange 111c of the lens holder 111 sufficiently enough for the plastic lens 12a so that the plastic lens 12a is snugly immovable between the wedge-shaped plastic retaining ring 112 and the annular rear flange 111c of the lens holder 111 and, then, the annular front collar 111d of the lens holder 111 is crushed against the wedge-shaped plastic retaining ring 112 sufficiently enough to prevent the wedge-shaped plastic retaining ring 112 from budging.

Even when applying external axial force to the plastic lens 12a through the wedge-shaped plastic retaining ring 112 upon crushing the annular front collar 111d of the lens holder 111 for riveting, the wedge-shaped plastic retaining ring 112 deforms and, in consequence, functions as buffer means to prevent the plastic lens 12a from causing distortion due to the strong riveting force while the plastic lens 12a is firmly fixed to the lens holder 111 and is kept in position precisely in the lens holder 111. Furthermore, the lens holding structure described above does not in any way involve the use of adhesive cement nor the use of hot welding, the plastic lens 12a is well prevented from causing distortion and precisely fixed in position to the lens holder 111.

Figure 5:
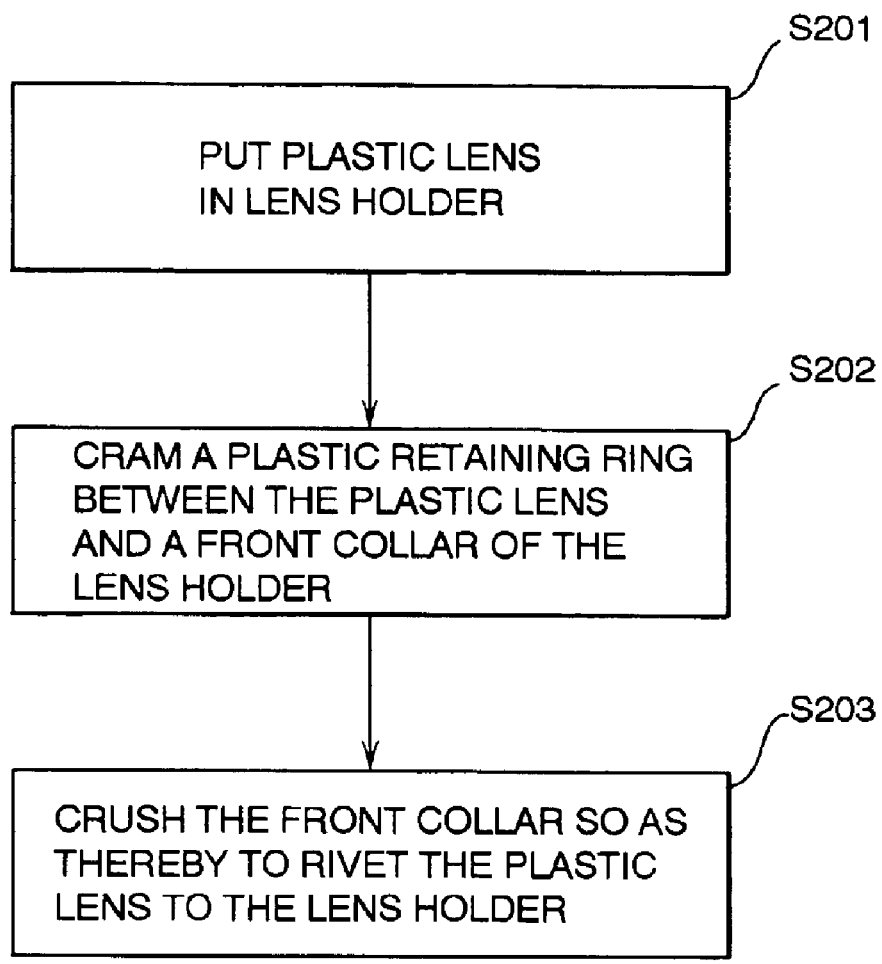
FIG. 5 is a flowchart illustrating a method of holding a plastic lens in a lens holder by riveting.

Referring to FIG. 5 showing a flowchart that illustrates a plastic lens holding method in sequence according to an embodiment of the present invention, as was previously described, the lens holder 111 is shaped so as to define an annular mounting space 111a have an axial distance greater than a thickness of the peripheral rim 11b of the plastic lens 11a between the annular frame 111b, the annular rear flange 111c and the annular front collar 111d. The plastic lens 12a is put in the lens holder 111 and then, loosely held in the lens holder 111 in step S201. Subsequently, in step S202, a wedge-shaped plastic retaining ring 112 made up of a resin material and having an inner annular groove 112a is crammed into an axial gap between the annular front collar 111d of the lens holder 111 and the peripheral rim 11b of the plastic lens 11a sufficiently enough for the plastic lens 12a to become immovable. Thereafter, in step S203, the annular front collar 111d is crushed against the wedge-shaped plastic retaining ring 112 so as to prevent the wedge-shaped plastic retaining ring 112 from budging.

As apparent from the above description, according to the plastic lens holding method, since the plastic lens 12a immovably held in the lens holder 111 through the plastic retaining ring 112 is riveted to the lens holder 111, even in the event where sufficiently strong riveting force is applied to the plastic lens 12a through the plastic retaining ring 112, the plastic lens 12a is prevented from causing distortion resulting from that the plastic retaining ring 112 deforms under the riveting force and, in consequence, functions as buffer means to absorb the riveting force. Furthermore, in the case of using the plastic retaining ring 112 with an annular groove 112a formed in an inner wall surface thereof, the plastic retaining ring 112 enhances its deforming capability with the consequence that the plastic lens 12a is more reliably prevented from causing distortion even under increased riveting force.

Although the present invention has been described in conjunction with a conventional photographic camera by way of example, it is of course that the present invention is realized in various optical instruments including digital cameras equipped with solid state image forming devices, vide cameras, overhead projectors, film projectors and the like in the same manner and with the same results.

Furthermore, it will be appreciated that variants and other embodiments can be effected by person of ordinary skill in the art without departing from the scope of the invention.

What is claimed is:

1. A method of fixedly holding a plastic lens in a lens holder by riveting the plastic lens to the lens holder, the method comprising the steps of:

setting a plastic lens in a lens holder having an annular mounting space defined by a front annular collar and a rear annular flange of the lens holder with a periphery of the plastic lens loosely received in the annular mounting space;

cramming a plastic retaining ring between said front annular collar and the periphery of the plastic lens so as to fixedly hold the lens in position in the lens holder due to deformation of the plastic retaining ring under axial load; and crushing the front annular collar against the plastic retaining ring so as thereby to rivet the plastic lens to the lens holder.

2. A method of fixedly holding a plastic lens in a lens holder as defined in claim 1, wherein the plastic retaining ring has an annular groove formed in an inner wall surface thereof so as to develop a tendency to pave the way for comparatively easy resilient deformation under external axial load.

3. A plastic lens holding structure for fixedly holding a plastic lens in a lens holder comprising:

a lens holder having an annular frame, a front annular collar extending inwardly from the annular frame, and a rear annular flange extending inwardly from the annular frame by which an annular mounting space for loosely receiving a periphery of a plastic lens is defined; and a plastic retaining ring that is crammed between the front annular collar and the periphery of the plastic lens put in the annular mounting space so that the plastic lens is riveted to the lens holder by crushing the front annular collar against the plastic retaining ring.

4. The plastic lens holding structure as defined in claim 3, wherein the plastic retaining ring has an annular groove formed in an inner wall surface thereof so as to develop a tendency to pave the way for comparatively easy resilient deformation under external axial load.

5. The plastic lens holding structure as defined in claim 3, wherein the plastic retaining ring has a generally wedge-shaped cross section.

* * * * *